United States Patent [19]

Lo et al.

[11] Patent Number: 5,539,737
[45] Date of Patent: Jul. 23, 1996

[54] PROGRAMMABLE DISRUPT OF MULTICAST PACKETS FOR SECURE NETWORKS

[75] Inventors: William Lo, Santa Clara; Ian Crayford, San Jose, both of Calif.

[73] Assignee: Advanced Micro Devices, Inc., Sunnyvale, Calif.

[21] Appl. No.: 366,806

[22] Filed: Dec. 30, 1994

[51] Int. Cl.[6] ................................................ H04L 9/00
[52] U.S. Cl. ..................... 370/60; 370/85.2; 370/85.13; 370/94.1; 380/9
[58] Field of Search ........................... 370/53, 58.1, 58.2, 370/58.3, 60, 85.1, 85.2, 85.3, 85.13, 85.14, 94.1; 380/9

[56] References Cited

U.S. PATENT DOCUMENTS

| | | | |
|---|---|---|---|
| 4,680,755 | 7/1987 | Reames | 370/85 |
| 4,901,348 | 2/1990 | Nichols et al. | 380/6 |
| 4,980,913 | 12/1990 | Skret | 370/85.1 X |
| 5,099,517 | 3/1992 | Gupta et al. | 380/29 |
| 5,161,192 | 11/1992 | Carter et al. | 380/48 |
| 5,177,788 | 1/1993 | Schanning et al. | 380/23 |
| 5,179,554 | 1/1993 | Lomicka et al. | 370/85.13 |
| 5,251,203 | 10/1993 | Thompson | 370/13.1 |
| 5,353,353 | 10/1994 | Vijeh et al. | 380/29 |
| 5,414,694 | 5/1995 | Crayford et al. | 370/13.1 |

OTHER PUBLICATIONS

"Lecture Notes In computer Science," Edited by Goos, G. and Hartmanis, J., "Local Area Network Security," Edited by Berson, T. A. and Beth, T., Workshop LANSEC '89, E.I.S.S. Karlsruhe, FRG, Apr. 3–6, 1989, pp. 31–52.
"Information technology—Local and metropolitan area networks—Part 3: Carrier sense multiple access with collision detection (CSMA/CD) access method and physical layer specifications," ISO/IEC 8802-3, ANSI/IEEE Std. 802.3, Fourth edition, 1993-07-08. (front page only).

Primary Examiner—Douglas W. Olms
Assistant Examiner—Russell W. Blum
Attorney, Agent, or Firm—Townsend and Townsend and Crew

[57] ABSTRACT

A secure repeater implementing data packet masking includes a programmable and selective, on a per port basis, multicast response. A multicast controller receives a multicast identifier extracted from a destination address field of a data packet. A plurality of memories, one associated with each port, determines the associated port's response to the multicast identifier. Each memory stores a multicast control code. When the multicast control code for a particular port has a value indicating that the associated port is enabled to receive multicast packets, assertion of the multicast identifier to the multicast controller for the particular port results in disabling the security masking for the port and subsequent transmission of unmodified data from the particular port.

7 Claims, 5 Drawing Sheets

PROGRAMMABLE DISRUPT OF MULTICAST PACKETS FOR SECURE NETWORKS

CROSS-REFERENCE TO RELATED APPLICATIONS

This application is related to "Address Tracking Over Repeater Based Networks" U.S. Pat. No. 5,353,353 issued on Oct. 10, 1994, "Repeater Security System," U.S. patent application Ser. No. 08/053,797 filed Apr. 26, 1993, U.S. patent application Ser. No. 08/337,634 filed Nov. 10, 1994, pending, U.S. patent application for "Programmable Address Mapping Matrix for Secure Networks," filed Dec. 30, 1994 Ser. No. 08/366,809, pending, and U.S. patent application for "Programmable Delay of Disrupt for Secure Networks," filed Dec. 30, 1994 Ser. No. 08/366,808, pending, all hereby expressly incorporated by reference for all purposes.

BACKGROUND OF THE INVENTION

The present invention relates generally to data packet security within a local area network and more specifically to an improved secure computer network having a selectable port disrupt or non-disrupt response to a multicast packet within a network that uses Multiport Secure Repeaters.

Networks of computers are commonly used in today's business environment. One common network system structure uses one or more repeaters. The repeater typically includes several ports. A particular data packet received at one port is retransmitted from the other ports of the repeater. Each repeater restores timing and amplitude degradations of data packets received on one port and retransmits them to all other ports, and hence over the network. For networks employing a CSMA/CD-type of network, such as an Ethernet network, every data packet passes through every repeater. Network administrators are thereby able to conveniently use each repeater as a device on the network from which to gather information concerning the operation of the network.

In traditional Ethernet (802.3 10BASE5) and Cheapernet (802.3 10BASE2), a coaxial cable provides a linear bus to which all nodes of a local area network are connected. A standard promulgated by the IEEE (IEEE Standard 802.3) defines various functionality for computer networks. This standard is expressly incorporated by reference for all purposes. Signaling is accomplished using a current synch technique wherein a center conductor of the coaxial cable is used for a signal and a shield conductor of the coaxial cable is used for a reference voltage (typically ground). Twisted pair Ethernet (802.3 10BASE-T) uses a standard voice grade telephone cable rather than the coaxial cable. The telephone cable uses separate pairs of conductive wires for transmission and reception.

When using twisted pair Ethernet, the network configuration is a star topology. The star topology provides for several end stations or data terminal equipment (DTE) devices all coupled to a multi-port repeater located at a center of the star. The repeater performs signal amplitude and timing restoration. The repeater receives a bitstream at one of its ports and restores signal amplitude levels and timing requirements. The repeater repeats the reshaped and retimed input bitstream to all of its other ports. In one sense, the repeater acts as a logical coaxial cable, permitting every node connected to the twisted pair network to receive each transmission from any other node, just as when a coaxial cable is used. The pairs of conductors use differential signaling, one pair for transmission and another pair for reception.

While a repeater is used in a traditionally wired coaxial Ethernet network as a mechanism to extend the physical distance limit of the network, in the IEEE 802.3 10BASE-T, the standard mandates the use of a repeater to provide connectivity between nodes whenever more than two nodes are present. Although physical signaling on the cabling differs between the traditional Ethernet-type of repeater and the twisted pair-type of repeater, the functionality of the repeaters are identical, as is the frame or packet format that is used to pass messages between the participating nodes on the network.

The frame commences with a preamble sequence which is an alternating ("1" and "0") pattern. The preamble sequence provides a single frequency on the network, in this case five MegaHertz (MHz) at the start of each frame, allowing a receiver to acquire and lock onto the associated bitstream. The preamble sequence is followed by a start of packet identifier that immediately precedes the data portion of the transmission. Either a start of frame delimiter (802.3) or synch sequence (Ethernet) delineates the start of the data portion of the message. Following the start of packet identifier are two address fields: a destination address (DA) and a source address (SA). These addresses are both forty-eight bit values and are transmitted least significant bit (LSB) first.

A media access controller (MAC) associated with each DTE uses the destination address to determine whether an incoming packet is addressed to the node it is associated with. When a receiving node detects a match between its own node address and an address transmitted in the destination address field, it attempts to receive the packet. Nodes having a MAC that does not detect a matching address typically ignore a remainder of the packet.

There are three types of destination addressing supported by the 802.3 standards:

1. Individual. The DA field contains an individual and unique address assigned to a single node on the network.

2. Multicast. When the first bit (LSB) of the DA is set, the remainder of the DA includes a group address. The group of nodes that are actually addressed is determined by a higher layer function. In general, use of a group address is designed to transmit a message to a logically similar subset of nodes on the network.

3. Broadcast. The broadcast is a special form of multicast address wherein the DA field is set to all "1's." This address is reserved, and all nodes on the network must be capable of receiving a broadcast message.

The MAC that transmits a data packet writes its own address into the SA field. This allows the transmitting MAC to identify those packets which it originates. The 802.3 standards do not require that a receiving MAC take any action based upon the SA field. In some applications, such as management, security or configuration, the SA field may be tracked and monitored.

A two-byte length/type field follows the SA field. The choice of length or type is dependent upon whether the frame is compatible with the IEEE 802.3 or the Ethernet standard. A higher order byte of the length/type field is transmitted first, with the LSB of each byte transmitted first.

A data field contains actual packet data that is transferred between end stations and is between forty-six to fifteen hundred bytes in length. A logical link control (LLC) function is responsible for fragmenting data into block sizes suitable for transmission over the network. Data bytes are transmitted sequentially with the LSB of each byte transmitted first.

A frame check sequence (FCS) is a four-byte field that contains a cyclic redundancy check (CRC) for the entire frame. The transmitting station computes the CRC throughout the DA, the SA, the length/type field, and data field. The transmitting station appends the FCS as the last four bytes of the frame. A receiving station uses the same CRC algorithm to compute the CRC for a received frame. The receiving station compares the CRC value it computes with the CRC value in the transmitted FCS. A mismatch indicates an error, such as a corrupted data frame. CRC bits of the FCS are transmitted in order: most significant bit (MSB) to LSB.

Figure 1:
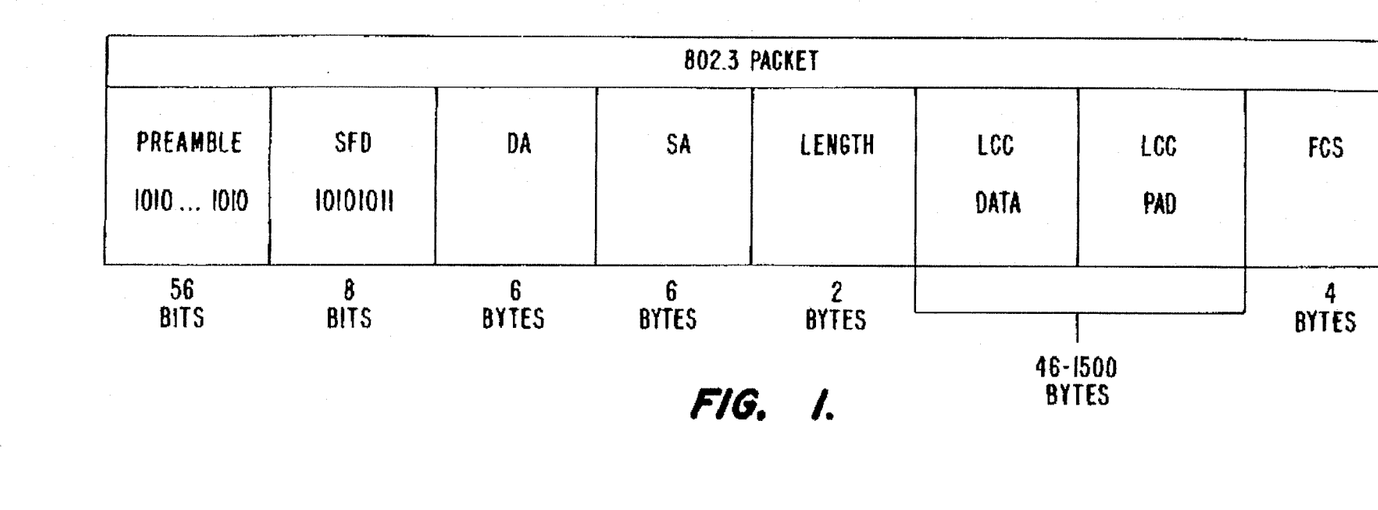
FIG. 1 is a diagram illustrating an IEEE 802.3 compliant frame format.
Figure 2:
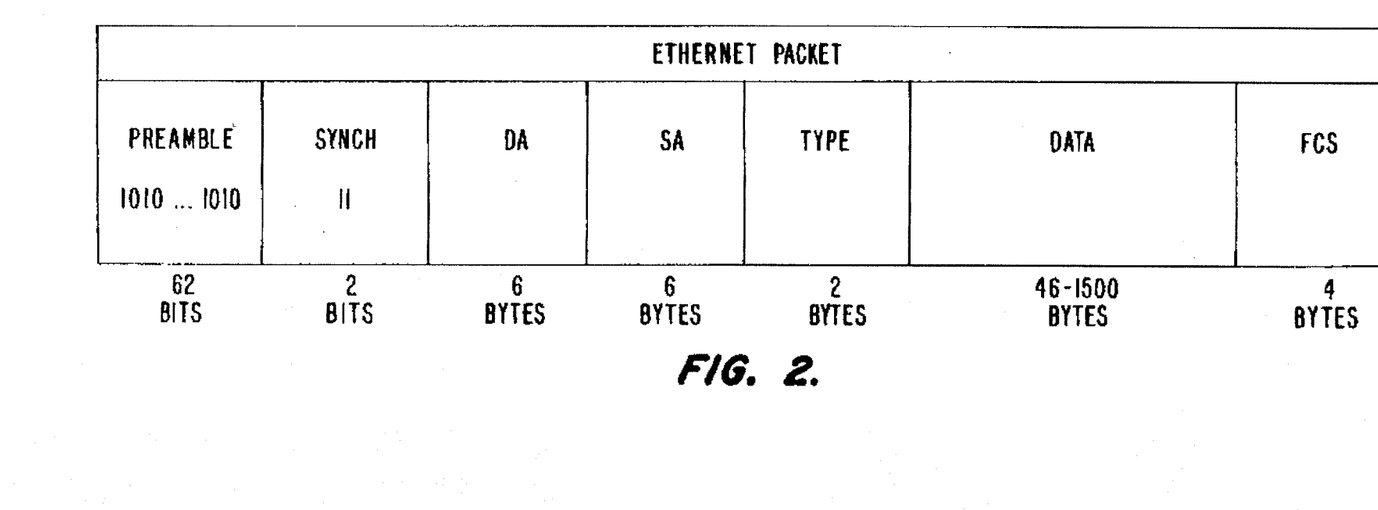
FIG. 2 is a diagram illustrating an Ethernet compliant frame format.

FIG. 1 and FIG. 2 are diagrams illustrating frame formats for an IEEE 802.3 Standard compliant frame and an Ethernet frame, respectively. Comparing the frame formats illustrates that a primary difference between the frame types is that the start of frame delimiter (SFD) for 802.3 is defined as a byte that has a "1 0 1 0 1 0 1 1 " pattern whereas the start frame (synch) of Ethernet is a "11" sequence. Even so, in both cases, a total number of bits for the preamble plus the start of frame indication is sixty-four bits long.

The 802.3 and Ethernet standards both specify that a frame must be in the range of sixty-four to fifteen hundred eighteen bytes (excluding preamble/SFD). However, the actual data field in the 802.3 system is permitted to be smaller than the forty-six byte value that is necessary to ensure this minimum size. To handle a smaller size data field, the MAC of a transmitting station appends pad characters to the LLC data field before sending data over the network. The Ethernet standard assumes that an upper layer ensures that the minimum data field is forty-six bytes before passing data to the MAC, therefore the existence of appended pad characters in unknown to the MAC implementing an Ethernet format.

The 802.3 standard also uses a length field that indicates the number of data bytes that are in the data field only. Ethernet, on the other hand, uses a type field in the same two bytes to identify the message protocol type. Since valid Ethernet type fields are always assigned outside of the valid maximum 802.3 packet length size, both 802.3 and Ethernet packets can coexist on the same network. Hence, it has been found that it is important to be able to track and monitor the addresses for a variety of reasons. For example, for secure networks it may be important that authentication is required to ensure that the appropriate nodes on the network receive the information. In addition, as networks change in the number of nodes attached thereto, it becomes important to be able to associate an address with a particular port or the like within the network.

It is also important in secure networks to selectively prevent a node from receiving such address information unless the node requires the information. If a data packet is not destined for a particular node, the particular node generally does not have a need for information within the data packet.

Further, it is important to provide a mechanism to associate the addresses of each port of a repeater with the actual port number or identity of the device. Typically, unsecured repeaters are devices that are just used for signal amplitude and timing restoration. In all of the above-mentioned modes, the secure repeater must also be provided with the capability to detect and interpret the various fields within data packets that are transmitted on the network.

As described above, every data packet transmitted in the computer network includes a destination address to identify the recipient of the data packet. A secure repeater in a secure network may have one or more end stations attached to each port. Each end station has one unique address assigned, and possibly one or more multicast addresses. The secure repeater maintains a list of associated end stations for each output port. The security systems identified in the incorporated references use the destination address field from each data packet to route a data packet to only those output ports associated with the destination address. Output ports of the repeater associated with a destination address not matching the destination address receive a modified, or disrupted, data packet.

The security system functions well for data packets addressed using the unique addresses. Special procedures are required in order to deal with the multicast packets.

SUMMARY OF THE INVENTION

The present invention provides apparatus and method for simply and efficiently controlling secure repeater response to a multicast data packet. The present invention provides for selective, programmable response, on a per port basis, to the multicast data packet. Certain output ports are set to enable them to retransmit multicast packets undisrupted, and others are set to modify retransmission of multicast packets.

According to one aspect of the invention, it includes an apparatus for controlling a multicast response to a multicast data packet. The apparatus includes a repeater having an input port for receiving a data packet having a destination address field wherein the destination address field includes a multicast identifier, and a plurality of output ports. The repeater includes a security system for transmitting the data packet from a first group of output ports of the plurality of output ports when associated addresses of the group of output ports match the destination address field. The security system transmitting a first output packet from a first output port when the first output port has an associated address not matching the destination address field, and a second output packet from a second output port when the second output port has an associated address not matching the destination address field. The apparatus includes a first multicast controller, coupled to the first output port and the security system, for controlling a first transmission of the first output packet by the security system, the first output packet is the same as the received data packet when the data packet includes the multicast identifiers. The apparatus also includes a second multicast controller, coupled to the second output port and the security system, for controlling a second transmission of the second output packet, the second transmission providing the second output packet as a disrupted data packet when the data packet includes the multicast identifier.

In summary, the preferred embodiment of the present invention permits:

(i) all data packets to pass undisrupted through the secure repeater for an initial period;

(ii) output ports that have been programmed for the 'pass multicast' mode will pass all multicasts without disruption;

(iii) output ports that are alternatively programmed for the 'secure multicast' mode will only pass a multicast when there is a perfect match between one or more stored addresses and a destination address in the received address; and (iv) output ports may be programmed to only perform security on individual (non-multicast) addresses, or to pass all individual addresses (no security at all).

In a further preferred embodiment of the present invention, the multicast controller includes a plurality of memories, one memory associated with each of the first and second output ports. Each memory stores a multicast control code, with each stored multicast control code indicating whether or not its associated output port is to retransmit the multicast packet.

In operation, the multicast controller selectively overrides the security system of the repeater in response to a multicast data packet. Each port is established as either being responsive to a multicast packet, or not responsive. When the multicast packet arrives, only those ports established as being responsive to the multicast packet will retransmit the packet. This allows a network administrator to identify those ports that are never to receive multicast packets, such as individual office or work cubicle locations which are not associated with the specific multicast group. For example, in an engineering company, the present invention could be used to prevent 'finance' multicast multicast packets from being received by 'engineering' end stations, and prevent 'engineering' multicasts from being received by 'marketing' end stations, etc. Note that some paths on a network may be considered 'secure' due to their physical location or accessibility, and these may be configured to forward all multicast packets. Such an example would be a repeater-to-repeater connection that was located in a locked wiring closet, hence physically secured. Such ports receive data packets only when expressly addressed.

Reference to the remaining portions of the specification, including the drawing and claims, will realize other features and advantages of the present invention. Further features and advantages of the present invention, as well as the structure and operation of various embodiments of the present invention, are described in detail below with respect to accompanying drawing. In the drawing, like reference numbers indicate identical or functionally similar elements.

DESCRIPTION OF THE PREFERRED EMBODIMENT

Figure 3:
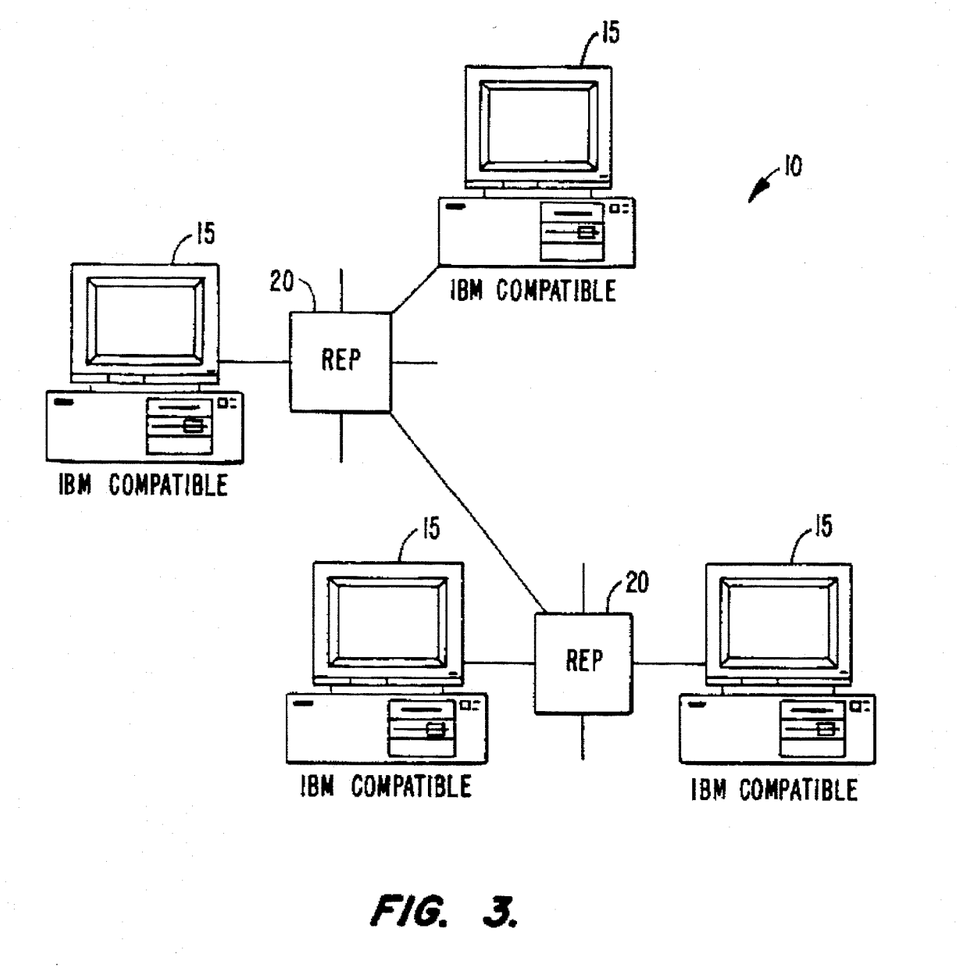
FIG. 3 is a block schematic diagram of a network of a plurality of personal computers implementing a star topology, the network including a secure repeater at each hub.

FIG. 3 is a block schematic diagram of a network 10 of a plurality of end stations 15 (e.g. personal computers) implementing a star topology, network 10 includes a secure repeater 20 at each hub. The preferred embodiment is implemented using a carrier sense multiple access with collision detection (CSMA/CD) compliant network. Secure repeater 20 conforms to the incorporated IEEE Standard 802.3.

In operation, network 10 passes a data packet from one end station 15, through one or more secure repeaters 20, to another end station 15. Secured repeater 20 receives the data packet at one port, and retransmits the data packet from other ports. Secure repeater 20 implements security features, such as data packet data masking, as described in the incorporated references.

Figure 4:
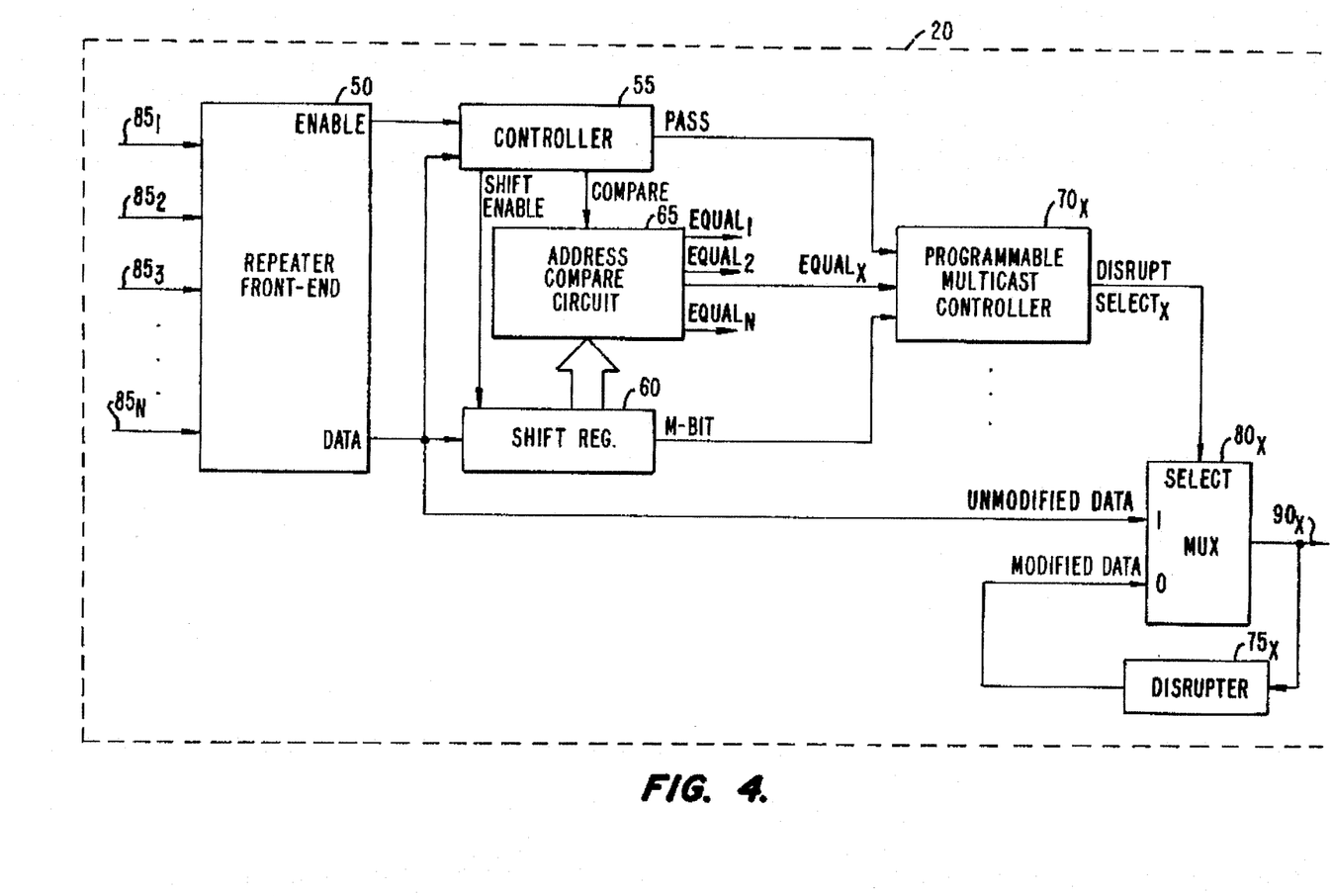
FIG. 4 is a detailed schematic block diagram of the secure repeater implementing selective multicast response.

FIG. 4 is a detailed schematic block diagram of secure repeater 20 shown in FIG. 3 implementing selective multicast response. Secure repeater 20 includes a repeater front-end 50, a controller 55, a shift register 60, an address compare circuit 65, a plurality of programmable multicast controllers $70_i$, a plurality of disrupters $75_i$, and a plurality of output data multiplexers $80_i$. In the preferred embodiment, the components of secure repeater 20, other than repeater front-end 50, make up security system features to extract fields from a data packet and make tests, and to verify routing.

For ease of explanation, only one programmable delay disrupt controller ($70_x$), one disrupter $75_x$, and one multiplexer $80_x$ are shown. It is understood that there is one disrupt controller, one disrupter and one multiplexer for every EQUAL line from address compare circuit 65. Repeater front-end 50 receives a data packet at a particular one port of a plurality of input ports 85i, i=1 to n, with n being the number of ports. Repeater front-end 50 processes the data packet in conformance with the incorporated IEEE 802.3 standard. Repeater front-end 50 outputs an ENABLE signal and a DATA signal that is a serial output stream. DATA is driven with the data from the input data packet. ENABLE is asserted once, and as long as, repeater front-end 50 drives DATA with valid data from the data packet.

Controller 55 is coupled to repeater front-end 50 and receives the ENABLE signal and the DATA signal. As described in more detail below, controller 55 includes logic to assert a SHIFT_ENABLE signal, a COMPARE signal, and a PASS signal responsive to the ENABLE and DATA signals.

Shift register 60 is coupled to both repeater front-end 50 and controller 55. Shift register 60 is a right shifting register that receives DATA at its input. Shift register 60 is responsive to an assertion of the SHIFT_ENABLE signal to shift bits of DATA into its memory. Shift register 60 holds forty-eight bits (six bytes), corresponding to the size of the destination address in the data packet. The bits stored in shift register 60 are output on a forty-eight bit wide output. Shift register 60 also outputs an M-BIT signal that is the value of one particular bit stored in memory. When a destination address is shifted into shift register 60, the M-BIT signal is the bit value of the bit position that indicates whether the data packet is a multicast packet. In the preferred embodiment, this bit position is the least significant bit (right-most bit).

Address compare circuit 65 is coupled to controller 55 and shift register 60. Address compare circuit 65 is an associative memory that associates one or more destination addresses with output ports. Address compare circuit 65 of the preferred embodiment, includes n number of $EQUAL_x$ output lines, X=1 to n. One EQUAL line corresponds to each output port. When COMPARE is asserted, address compare circuit 65 compares the forty-eight bits output from shift register 60 to the destination addresses stored in memory. For each match, address compare circuit 65 asserts $EQUAL_x$ for the associated output port $90_x$ having an associated address matching the output of shift register 60. Any number, from zero to all, of the EQUAL lines may be asserted. Additional details regarding structure and operation of address compare circuit 65 are described in the incorporated references.

Each programmable multicast controller $70_i$ is coupled to controller 55, shift register 60 and address compare circuit 65. Each multicast controller $70_i$ receives a different one of the EQUAL signals, one multicast controller $70_i$ for each, as well as the global PASS signal and the M-BIT signal. In response to assertions of PASS, $EQUAL_x$, and M-BIT, a particular one multicast controller $70_x$ drives a DISRUPT $SELECT_x$ signal either HIGH or LOW.

Multicast controller $70_x$ drives DISRUPT $SELECT_x$ according to the following logic equation:

$$DISRUPT\ SELECT_x = ((EQUAL_x \cap A(X)) \cup (M\text{-}BIT \cap B(X)) \cup PASS \cup C(X)$$

where A(X), B(X), and C(X) represent outputs of programmable registers associated with port $90_x$, with A(X) asserted when normal security unicast addressing is enabled, with B(X) asserted when multicast response is enabled, and with C(X) asserted when security features are disabled. The logic equation may be expressed by the following truth table:

TABLE I

| | | Controller $70_X$ | | | | |
| --- | --- | --- | --- | --- | --- | --- |
| $EQUAL_X$ | A(X) | M-BIT | B(X) | PASS | C(X) | DISRUPT $SELECT_X$ |
| X | X | X | X | 1 | X | 1 |
| X | X | X | X | X | 1 | 1 |
| X | 0 | X | 0 | 0 | 0 | 0 |
| 0 | 1 | X | 0 | 0 | 0 | 0 |
| X | 0 | 0 | 1 | 0 | 0 | 0 |
| 1 | 1 | X | X | 0 | 0 | 1 |
| X | X | 1 | 1 | 0 | 0 | 1 |
| 0 | X | 0 | X | 0 | 0 | 0 |

1 — The signal is asserted
0 — The signal is deasserted
X — Don't care.

Disrupter $75_x$ provides modified data to output port $90_x$ in place of DATA whenever port $90_x$ is not to receive DATA, i.e., the data packet masking feature is activated. As implemented, disrupter $75_x$ outputs alternating "1's" and "0's" by implementing a simple multivibrator. In the preferred embodiment, disrupter $75_x$ has an input of a flip-flop coupled to output port $90_x$, and an inverter coupled to an output of the flip-flop. The output of the inverter is the output of disrupter $75_x$.

Multiplexer $80_x$ includes two inputs, a "0" input coupled to the output of disrupter $75_x$ and a "1" input coupled to DATA from repeater front-end 50. Multiplexer $80_x$ is responsive to DISRUPT $SELECT_x$ provided at a $SELECT_x$ input to route one of the inputs to output port $90_x$. When DISRUPT $SELECT_x$ is driven LOW, multiplexer $80_x$ routes modified data from disrupter $75_x$ to output port $90_x$. When DISRUPT $SELECT_x$ is driven HIGH, multiplexer $80_x$ routes DATA to output port $90_x$.

In operation, repeater front-end 50 receives a multicast packet at one of its input ports $85_i$. Repeater front-end 50 drives DATA with the serial bits contained in the multicast packet and asserts ENABLE when DATA is valid. Forty-eight bits immediately following the start of frame delimiter make up the destination address field.

Controller 55 counts the incoming bits of DATA. SHIFT_ENABLE is asserted until the destination address is shifted into shift register 60, at which point shift register 60 is locked by deasserting SHIFT_ENABLE. The multicast bit M-BIT is driven with the value of the multicast identifier when the destination address is locked in shift register 60. Initially, M-BIT is LOW. When the data packet is a multicast packet, M-BIT is asserted HIGH. Controller 55 asserts PASS until the destination address has been locked into shift register 60. Controller 55 asserts COMPARE after deasserting SHIFT_ENABLE.

Assertion of COMPARE causes address compare circuit 65 to compare the destination address to each of a plurality of stored addresses. These stored addresses correspond to associated end user stations 15 coupled to output ports 90 of secure repeater 20. In other words, a particular end user station $15_x$, having an address $ADDRESS_x$, that is coupled to output port $90_x$ has $ADDRESS_x$ stored in a particular memory of compare circuit 65 that is associated with PORT $90_x$. When the destination address stored in shift register 60 is compared with all the stored addresses, one or more $EQUAL_x$ signals are asserted when a match is found. $EQUAL_x$ is asserted for each port $90_x$ having a matching associated stored address.

Multicast controller $70_x$ receives the PASS signal, the M-BIT signal, and the $EQUAL_x$ signal. As described above, when PASS is asserted, multicast controller $70_x$ drives DISRUPT $SELECT_x$ HIGH, thereby routing DATA to output port $90_x$. As PASS stays asserted until the destination address is completely shifted into shift register 60, the PASS signal ensures that a valid destination address is always transmitted from each output port $90_x$. After controller 55 deasserts PASS, multicast controller $70_x$ drives DISRUPT $SELECT_x$ LOW unless $EQUAL_x$ or M-BIT is asserted and those features are enabled. When DISRUPT $SELECT_x$ is LOW, modified data is output from output port $90_x$.

For details of the state of DISRUPT $SELECT_x$ refer to the truth table presented above in Table I. Multicast controller $70_x$ satisfies the logic equation and truth table.

Figure 5:
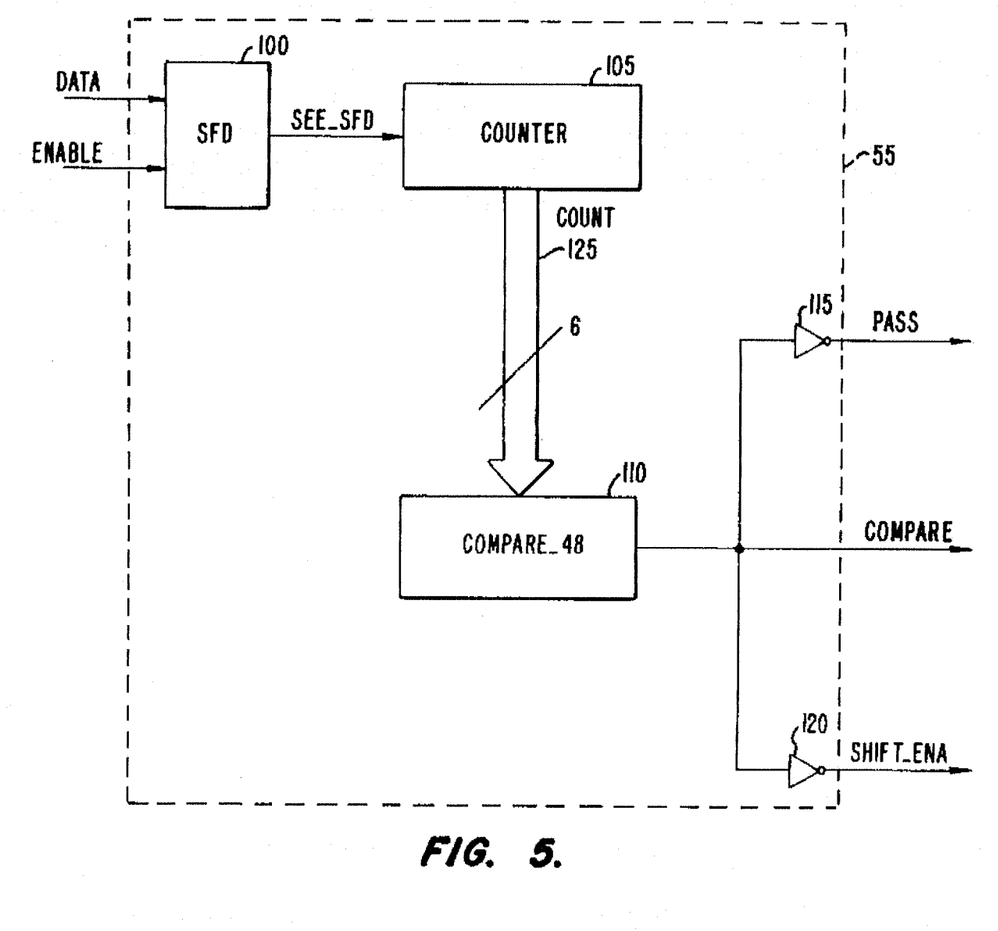
FIG. 5 is a detailed block diagram of a controller used in the secure repeater shown in FIG. 4.

FIG. 5 is a detailed block diagram of controller 55 shown in FIG. 4. Controller 55 includes a start frame detector (SFD) 100, a counter 105, a compare circuit 110, and two inverters (115 and 120). The DATA and ENABLE signals are input into SFD 100. SFD 100 monitors DATA for the start of frame delimiter (SFD). After the start of frame delimiter is detected, SFD 100 asserts a SEE_SFD signal. The SEE_SFD signal is asserted after the start of frame delimiter is detected and remains asserted as long as ENABLE remains asserted.

Counter 105 is coupled to SFD 100 and is responsive to the SEE_SFD signal to increment a total count once per bit time. Thus, counter 105 counts each bit of DATA after the start of frame delimiter. The total count of counter 105 is output on six lines making up count bus 125.

Compare circuit 110 is coupled to count bus 125 and monitors the total count of counter 105. Initially, COMPARE is LOW. When counter 105 counts to forty-eight (48), compare circuit 110 asserts the COMPARE signal HIGH. An input of inverter 115 and inverter 120 are each coupled to the output of compare circuit 110. An output of inverter 115 drives the PASS signal and an output of inverter 120 drives the SHIFT_ENABLE signal. Controller 55, in the preferred embodiment, asserts PASS and SHIFT_ENABLE HIGH until counter 105 counts to forty-eight.

Figure 6:
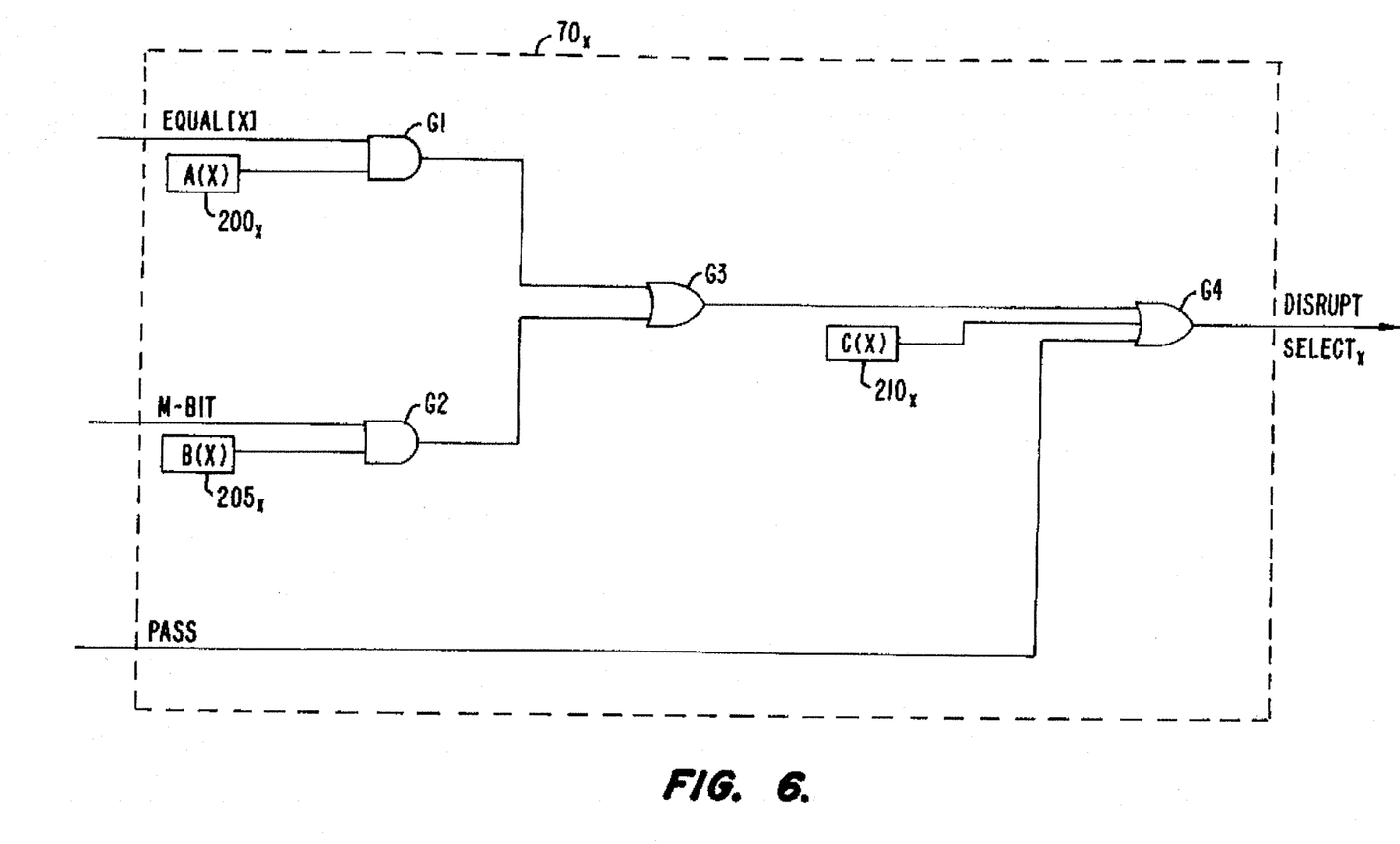
FIG. 6 is a detailed schematic diagram of the multicast controller shown in FIG. 4.

FIG. 6 is a detailed schematic diagram of a preferred embodiment for multicast controller $70_x$ shown in FIG. 4. Multicast controller $70_x$ includes two dual input AND gates (G1 and G2), a dual input OR gate G3, a triple input OR gate G4, and three externally-programmable latches ($200_x$, $205_x$, and $210_x$). AND gate G1 receives the $EQUAL_x$ signal at one input and an output from latch $200_x$ at the other input. AND gate G2 receives the M-BIT signal at one input and an output from latch $205_x$ at the other input. Outputs from AND gate G1 and AND gate G2 are inputs into OR gate G3. OR gate G4 receives an output from OR gate G3 at one input and the PASS signal at another input. An output of latch $210_x$ is coupled to the third input of OR gate G4. An output of OR gate G4 drives the DISRUPT SELECT$_x$ signal.

In operation, assertion of PASS asserts DISRUPT SELECT$_x$ until after the address comparisons are complete. Thereafter, controller 55, shown in FIG. 4, deasserts PASS. Latch $200_x$ controls whether normal security features are enabled for port $90_x$. That is, if security for port $90_x$ is enabled (permitting port $90_x$ to transmit any data packets expressly addressed to it), then latch $200_x$ stores and provides a "1" to AND gate G1. When EQUAL$_x$ is asserted and latch $200_x$ stores the "1", AND gate G1 will assert its output. With the output of AND gate G1 asserted, the output of OR gate G3 is asserted thereby driving the DISRUPT SELECT$_x$ signal HIGH.

Similarly, latch $205_x$ controls whether port $90_x$ is responsive to a multicast packet. When multicast response is desired for a particular port $90_x$, latch $205_x$ stores and provides a "1" to AND gate G2. Otherwise, latch $205_x$ stores and provides a "0" to AND gate G2. When both the M-BIT signal and the output from latch $205_x$ are asserted, the DISRUPT SELECT$_x$ signal will be driven HIGH and the multicast packet will not be disrupted. When latch $205_x$ stores a "0," port $90_x$ is disabled from responding to any multicast packet.

Latch $210_x$ controls security features for port $90_x$. When security for port $90_x$ is enabled, latch $210_x$ stores and provides a "0" to OR gate G4. Consequently, DISRUPT SELECT$_x$ is controlled by PASS, EQUAL(X), M-BIT, and the values in latch $200_x$ and $205_x$. However, if the security features are to be disabled for port $90_x$, then latch $210_x$ stores and provides a "1" to OR gate G4. With a "1" stored in latch $210_x$, security features for port $90_x$ are disabled. Thus, DISRUPT SELECT$_x$ will always be HIGH, constantly selecting DATA for transmission from port $90_x$. With security features disabled, secure repeater 20 performs like an ordinary unsecured repeater.

As described, secure repeater 20 provides for selective and programmable response, on a per port basis, to a multicast data packet. Some ports can be disabled from multicast response allowing only direct addressing, and other ports can be enabled to permit multicast response. Writing different values into register $205_x$, for different values of X, results in different multicast responses for the ports of secure repeater 20.

In conclusion, the present invention provides a simple, efficient solution to selective response of a secure repeater to a multicast packet. While the above is a complete description of the preferred embodiments of the invention, various alternatives, modifications, and equivalents may be used. Therefore, the above description should not be taken as limiting the scope of the invention which is defined by the appended claims.

What is claimed is:

1. An apparatus for controlling a multicast response to a multicast data packet, comprising:

a repeater including an input port for receiving a data packet having a destination address field wherein said destination address field includes a multicast identifier, and a plurality of output ports, said repeater including a security system for transmitting said data packet from each output port of a first group of said plurality of output ports when an associated address matches said destination address field, said security system transmitting a first output packet from a first output port of said plurality of output ports when a first associated address of said first port does not match said destination address field, and transmitting a second output packet from a second output port of said plurality of output ports when a second associated address of said second output port does not match said destination address field;

a first multicast controller, coupled to said first output port and said security system, for controlling a first transmission of said first output packet by said security system, said first transmission providing said data packet as said first output packet when said data packet includes said multicast identifier; and a second multicast controller, coupled to said second output port and said security system, for controlling a second transmission of said second output packet by said security system, said second transmission providing said second output packet as a disrupted data packet when said data packet includes said multicast identifier.

2. The apparatus of claim 1 further comprising:

a first and a second memory, respectively coupled to said first and second multicast controller, for respectively storing a first and a second multicast control code, said first memory storing a first value for said first multicast control code indicating said first output port is to retransmit said data packet and said second memory storing a second value for said second multicast control code indicating said second output port is not to retransmit said data packet.

3. A repeater having a plurality of ports, comprising:

a repeater front-end for receiving a data packet at a first port of the plurality of ports, said data packet including a destination address field, said destination address field including a multicast identifier, said repeater front-end driving a first output with said data packet and driving a second output with an ENABLE signal;

a disrupter, coupled to of said repeater front-end, for providing a modified data packet at an output of said disrupter;

a shift register, coupled to said repeater front-end and responsive to a SHIFT_ENABLE signal, for extracting said destination address field from said data packet, and for extracting said multicast identifier from said destination address field;

an address compare circuit, coupled to said shift register and responsive to an assertion of a COMPARE signal, for comparing said destination source address to a plurality of stored addresses, each stored address corresponding to one of the plurality of ports, said address compare circuit having a plurality of EQUAL signals each corresponding to one of said stored addresses wherein said address compare circuit asserts a particular one EQUAL signal corresponding to a particular stored address matching said destination address field;

a controller, coupled to said repeater front end, said shift register and said address compare circuit, and responsive to said ENABLE signal and to said data packet, for asserting said SHIFT-ENABLE signal and said compare signal;

a plurality of multicast controllers, a particular one multicast controller coupled to said particular one EQUAL signal of said plurality of EQUAL signals and to said shift register, for driving a plurality of DISRUPT SELECT signals each having a first state and a second state, said particular one multicast controller including a memory for storing a multicast control code and driving a first one of said DISRUPT SELECT signals with said first state when said multicast identifier indicates said data packet is a multicast packet and said multicast control code enables multicasting response; and a multiplexer, coupled to said repeater front end and to said disrupter, for routing said data packet to a particular output port of the repeater that corresponds to said particular one multicast controller when said first one DISRUPT SELECT signal has said first state, otherwise, said multiplexer routing said modified data packet to said output port when said DISRUPT SELECT signal has said second value.

4. A method for transmitting a multicast packet from a repeater having a security system for transmitting a data packet received at an input port to a first output port of a plurality of output ports when an associated first address matches a destination address field, and transmitting a modified data packet to a subset of said plurality of output ports when associated addresses do not match said destination address field; comprising the steps of:

detecting when the data packet is the multicast packet;

comparing a multicast control word stored in each memory of a plurality of memories associated with the subset of output ports to a multicast identifier in the multicast packet, to determine a group of associated output ports that are to receive the multicast packet; and transmitting the multicast packet from said group of output ports and transmitting a modified data packet from output ports not within said group.

5. A repeater comprising:

a repeater front-end having an input port for receiving a data packet including a destination address field wherein said destination address field includes a multicast identifier, and a plurality of output ports, said repeater front-end including a security system for transmitting a modified data packet to a subset of said plurality of output ports having addresses not matching said destination address field; and means, coupled to said repeater front-end, for asserting a multicast signal when said data packet is a multicast signal; and means, coupled to said asserting means and to said repeater front-end, for selectively disabling said security system for a predetermined particular one output port when said multicast signal is asserted.

6. An apparatus for controlling a multicast response to a multicast data packet, comprising:

a repeater including an input port for receiving a data packet having a destination address field wherein said destination address field includes a multicast identifier, and a plurality of output ports, said repeater including a security system for transmitting a first output packet from a first output port of said plurality of output ports when a first associated address of said first port does not match said destination address field, and transmitting a second output packet from a second output port of said plurality of output ports when a second associated address of said second output port does not match said destination address field;

a first multicast controller, coupled to said first output port and said security system, for controlling a first transmission of said first output packet by said security system, said first transmission providing said data packet as first output packet when said data packet includes said multicast identifier; and a second multicast controller, coupled to said second output port and said security system, for controlling a second transmission of said second output packet by said security system, said second transmission providing said second output packet as a disrupted data packet when said data packet includes said multicast identifier.

7. In a network including a plurality of intercoupled repeaters, a particular repeater for controlling a multicast response to a multicast data packet, comprising:

a repeater front-end including an input port for receiving a data packet having a destination address field wherein said destination address field includes a multicast identifier, and a plurality of output ports, said repeater including a security system for transmitting a first output packet from a first output port of said plurality of output ports when a first associated address of said first port does not match said destination address field, and transmitting a second output packet from a second output port of said plurality of output ports when a second associated address of said second output port does not match said destination address field;

a first multicast controller, coupled to said first output port and said security system, for controlling a first transmission of said first output packet by said security system, said first transmission providing said data packet as first output packet when said data packet includes said multicast identifier; and a second multicast controller, coupled to said second output port and said security system, for controlling a second transmission of said second output packet by said security system, said second transmission providing said second output packet as a disrupted data packet when said data packet includes said multicast identifier.

* * * * *

UNITED STATES PATENT AND TRADEMARK OFFICE
CERTIFICATE OF CORRECTION

PATENT NO.   : 5,539,737

DATED        : July 23, 1996

INVENTOR(S)  : William Lo and Ian Crayford

It is certified that error appears in the above-identified patent and that said Letters Patent is hereby corrected as shown below:

At Column 10, Line 35, delete "of"

Signed and Sealed this

Twenty-sixth Day of November 1996

Attest:

BRUCE LEHMAN

*Attesting Officer*            Commissioner of Patents and Trademarks